3,151,976
STEEL MAKING
Ernest Glaesener, 4 Rue Karl Marx,
Dudelange, Luxembourg
No Drawing. Filed Apr. 10, 1964, Ser. No. 358,951
Claims priority, application Luxembourg, Dec. 5, 1960, 39,499
5 Claims. (Cl. 75—53)

This invention relates to a converter method of steel making, and is a continuation-in-part of applicant's co-pending application Serial No. 156,528, filed December 1, 1961.

In processes relating to the pneumatic fining of pig iron, it is known to retain in the converter the final oxidized slag of a fining operation in order to contribute towards the formation of the slag for the following operation. This slag is usually retained in the converter during the pouring of the steel by the nose, holding it back by means of a barrier of lime. For this purpose it is also possible to provide the rounded portion of the dome of the converter with a pouring hole, which considerably facilitates the pouring off of the steel. By this means almost all the oxidized slag can be retained in the converter without using a lime barrier.

By means of this process it is thus possible to recover the iron contained in the final slag formation of the operation, and this advantage is particularly interesting in the LD and LDAC processes and in rotary furnace processes, in which the final slag normally has a very high iron content.

If, however, a certain quantity of crude liquid pig iron is abruptly introduced into a converter containing an oxidized slag having a high iron content of this type, particularly violent chemical reactions are immediately produced due principally to the oxidation by the slag of a part of the carbon in the pig iron. These reactions cause the appearance of very long flames which hinder the operation of pouring the pig iron into the converter. In addition, a part of the liquid mass may be thrown out of the converter, all the more so because the latter is at that moment in the horizontal position. If for the purpose of obviating these disadvantages the pig iron is poured very slowly onto the slag, the resulting loss of time may be very considerable.

It has already been attempted to suppress or reduce this splashing by thickening the fluid slag by means of solid additives, such as lime in the form of powder, granules, or lumps. Unfortunately, by this means the slag becomes less reactive and violent reactions may still occur at the end of the operation of pouring the pig iron.

The present invention relates to a process which enables the disadvantages to be overcome, while retaining a sufficiently reactive and fluid slag.

The process according to the present invention has essentially for its object that before charging the pig iron necessary for a fining operation in the converter, or any other fining apparatus intended for the same purposes and containing the slag from the preceding operation, a reducing agent is added to the said slag, irrespective of position of the converter or apparatus.

A further object and interesting modification of the process of the invention consists in supplying the reducing agent to the slag by pneumatic means after having reduced it to granular, preferably pulverulent form.

It has been found particularly advantageous to use carbon or granulated pig iron as reducing agents.

*Examples*

(1) 80 kg. of carbon in the form of powder or granules of 0.5 to 3 mm. are injected by pneumatic means into a 30 ton converter which is in the upright position and contains 2,500 kg. of slag recovered from the previous charge.

(2) 2 tons of pig iron granules are introduced by means of a spout serving a hopper into a 30 ton converter which is in the erect position and contains 3,000 kg. of slag recovered from the preceding charge. After the addition, the converter is tipped in order to intensify the mixing.

(3) After tapping the steel out of a 30-ton converter provided with a tap hole, 2,500 kg. of slag rich in iron oxides are left in the converter; the vessel is brought back to its upright position and a lance is introduced through the mouth inside the converter. Through this lance, 80 kg. of carbon in the form of powder or granules of 0.5 to 3 mm. diameter are injected by pneumatic means on the retained oxidized slag. Hereby the slag is reduced, but still remains in a fluid and reactive state. Then the lance is taken out of the converter and the pig iron and the following charge is immediately poured into the converter.

(4) In a 30-ton converter 3,000 kg. of oxidized slag are recovered from a preceding charge. The converter is brought back to its vertical position and 2 tons of pig iron granules are introduced into the converter by means of a spout fed by a hopper; the granules fall from the spout through the mouth of the converter on the slag. After the addition the converter is tipped in order to intensify the mixing, and pig iron is introduced for the next charge with no violent reactions occurring.

What I claim is:

1. A process of refining pig iron in a converter which consists in retaining in said converter the final slag of a refining operation in order to contribute towards the constitution of the slag of the following operation, and adding a reducing agent to the said slag before charging the liquid pig iron necessary for said following operation, to moderate the violent reactions which generally occur between said slag and said liquid pig iron.

2. A process of refining pig iron in a converter which consists in retaining in said converter the final slag of a refining operation in order to contribute towards the constitution of the following operation, and adding a reducing agent in pulverulent form and pneumatically to the said slag before charging the liquid pig iron necessary for the following operation, to moderate the violent reactions which generally occur between said slag and said liquid pig iron.

3. A process for refining pig iron in a converter which consists in retaining in said converter the final slag of a refining operation to contribute towards the constitution of the slag of the following operation, and adding a reducing agent in granular form to the said slag before charging the liquid pig iron necessary for the following operation, to moderate the violent reactions which generally occur between said slag and said liquid pig iron.

4. A process of refining pig iron in a converter which consists in retaining in said converter the final slag of a refining operation to contribute towards the constitution of the slag of the following operation, and adding carbon to the said slag before charging the liquid pig iron necessary for the following operation, to moderate the violent reactions which generally occur between said slag and said liquid pig iron.

5. A process of refining pig iron in a converter which consists in retaining in said converter the final slag of a refining operation to contribute towards the constitution of the slag of the following operation, and adding granulated pig iron to the said slag before charging the liquid pig iron necessary for the following operation, to moderate the violent reactions which generally occur between said slag and said liquid pig iron.

No references cited.